United States Patent
Mazoyer

(10) Patent No.: US 9,809,272 B2
(45) Date of Patent: Nov. 7, 2017

(54) SET OF ELEMENTS GIVING THE POSSIBILITY OF FORMING TWO TYPES OF WHEELED DEVICES FOR CHILDREN

(71) Applicant: ID Development Limited, Tsim Sha Tsui (HK)

(72) Inventor: Joseph Mazoyer, Sainte Foy les Lyon (FR)

(73) Assignee: ID Development Limited, Tsim Sha Tsui (HK)

( * ) Notice: Subject to any disclaimer, the term of this patent is extended or adjusted under 35 U.S.C. 154(b) by 0 days.

(21) Appl. No.: 15/079,238

(22) Filed: Mar. 24, 2016

(65) Prior Publication Data

US 2016/0304152 A1 Oct. 20, 2016

(30) Foreign Application Priority Data

Apr. 14, 2015 (FR) ...................................... 15 53228
Oct. 16, 2015 (FR) ...................................... 15 59851
Nov. 18, 2015 (EP) ...................................... 15195187

(51) Int. Cl.
*B62K 15/00* (2006.01)
*B62H 7/00* (2006.01)
(Continued)

(52) U.S. Cl.
CPC ............. *B62K 15/006* (2013.01); *B62H 7/00* (2013.01); *B62K 3/002* (2013.01); *B62K 5/06* (2013.01);
(Continued)

(58) Field of Classification Search
CPC ........ B62K 9/00; B62K 13/00; B62K 15/006; B62K 19/30; B62K 9/02
See application file for complete search history.

(56) References Cited

U.S. PATENT DOCUMENTS

D785,716 S * 5/2017 Herlitz ........................ D21/423
2011/0198819 A1* 8/2011 Jessie, Jr. ................ B62K 9/00
280/7.15
(Continued)

FOREIGN PATENT DOCUMENTS

CN 202754075 7/2012
DE 202011001596 4/2011

*Primary Examiner* — Kevin Hurley
*Assistant Examiner* — Marlon A Arce
(74) *Attorney, Agent, or Firm* — Defillo & Associates, Inc.; Evelyn A. Defillo

(57) ABSTRACT

A set of elements giving the possibility of forming two types of wheeled devices for children which comprises:
a platform (10),
a handle (3) comprising an upright (20) intended to be connected to the front of the platform (10), and
a removable seat (6);
said handle (3) is removable with respect to the platform (10), and the platform (10) comprises, on the side of the front wheel(s) (11), a well (13) for receiving the lower portion of the upright (20);
the platform (10) comprises a front boss (14) and said well (13) opens at the upper portion of this boss (14);
the set of elements comprises a body (4) for supporting the seat (6), the front portion (4*a*) of which has a front extension (22) and a rear extension (23) defining together a housing (24) having a recessed shape corresponding to the shape of the boss (14);
the set of elements comprises means (28, 31) for mounting the seat (6) on said supporting body (4), and
the set of elements comprises means (5) for attaching at least one of said extensions (22, 23) to the platform (10).

10 Claims, 6 Drawing Sheets

(51) Int. Cl.
*B62K 3/00* (2006.01)
*B62K 9/00* (2006.01)
*B62K 13/00* (2006.01)
*B62K 5/06* (2006.01)
*B62K 19/30* (2006.01)

(52) U.S. Cl.
CPC ................ *B62K 9/00* (2013.01); *B62K 13/00* (2013.01); *B62K 19/30* (2013.01)

(56) References Cited

U.S. PATENT DOCUMENTS

| | | | |
|---|---|---|---|
| 2012/0181773 A1* | 7/2012 | Ouboter | B62K 3/002 280/263 |
| 2013/0082451 A1* | 4/2013 | Lin | B62K 3/002 280/87.021 |
| 2014/0217685 A1 | 8/2014 | Byrne et al. | |

* cited by examiner

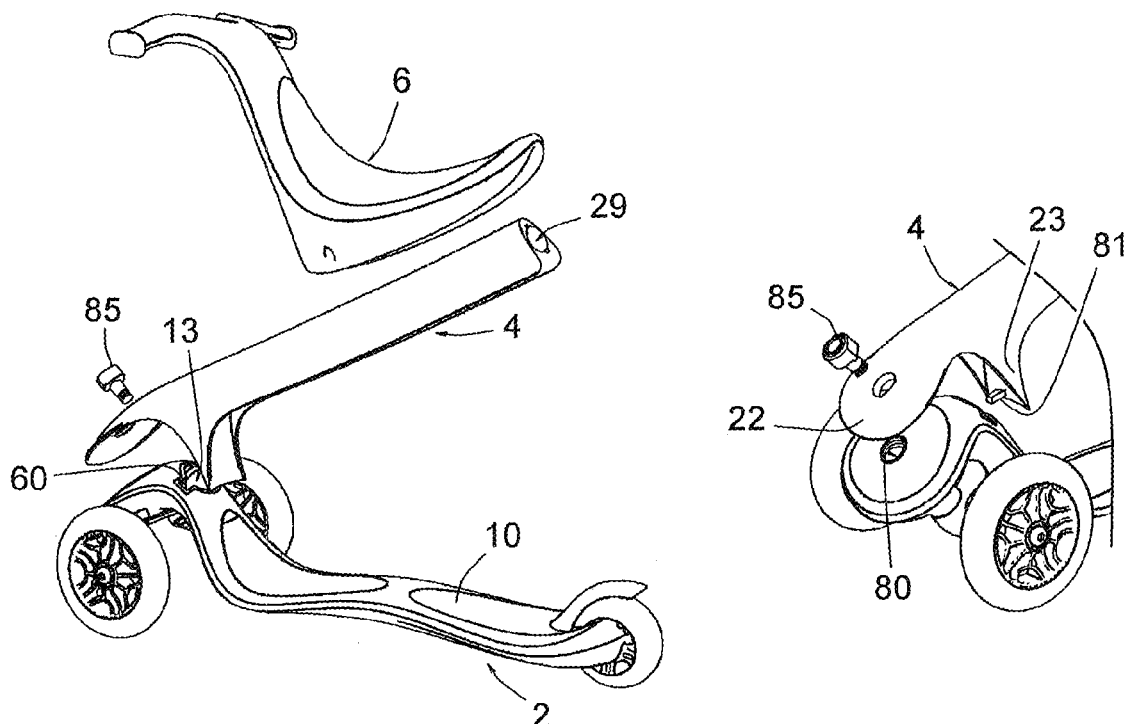
FIG. 11
FIG. 12
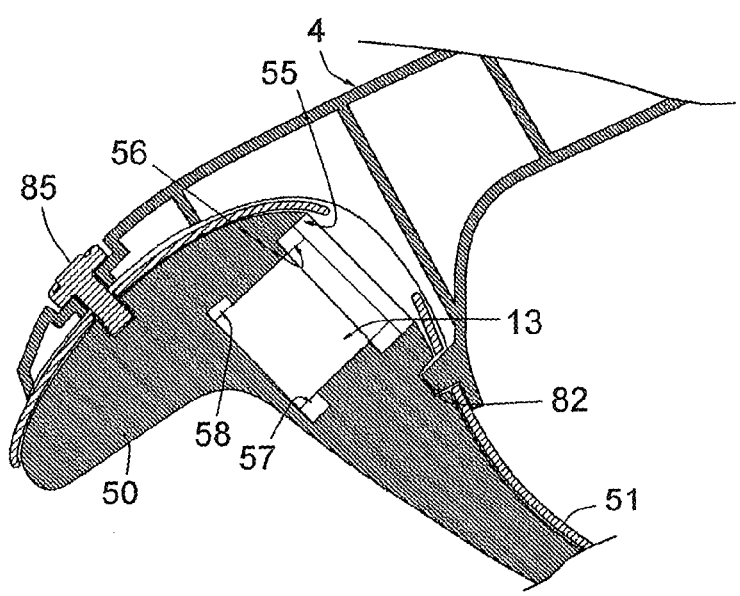
FIG. 13

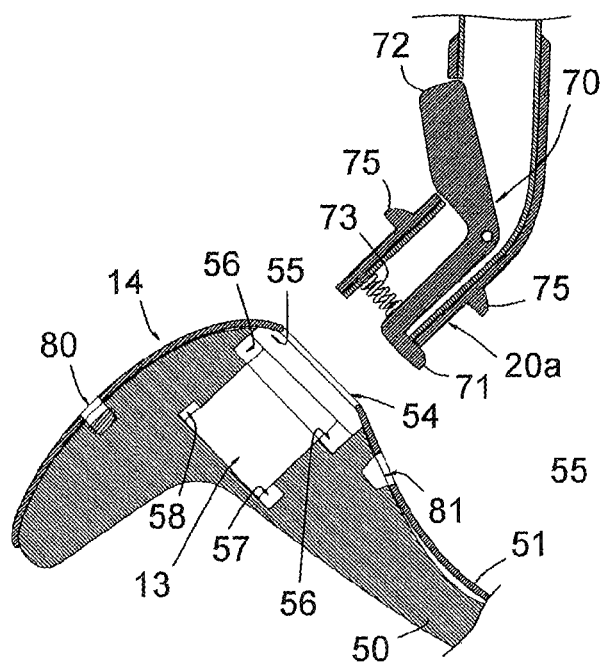
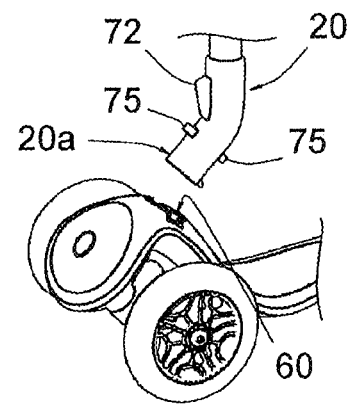
FIG. 14
FIG. 15
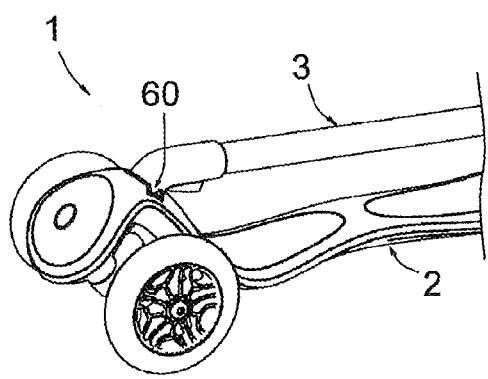
FIG. 16
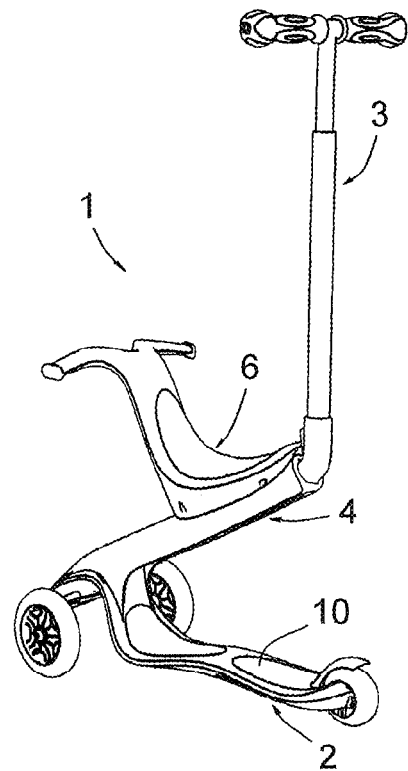
FIG. 17

SET OF ELEMENTS GIVING THE POSSIBILITY OF FORMING TWO TYPES OF WHEELED DEVICES FOR CHILDREN

FIELD OF INVENTION

The present invention relates to a set of elements giving the possibility of forming two types of wheeled devices for children, i.e. a device of the scooter type and a device intended to be straddled.

The term of "scooter" should be understood in a broad sense, as designating any type of device comprising a platform provided with at least one front wheel, with at least one rear wheel and a handle on the front allowing a child of maintaining himself/herself on the platform.

BACKGROUND OF THE INVENTION

A scooter is an attractive device for a child but who should be the subject of a learning process in order to prevent falls. For this purpose, it is known how to provide the mounting of a removable seat on a scooter, which facilitates this learning process.

However, existing scooters are not perfect from the point of view of this learning process.

Further, the known device is not easily adaptable to the size of the child.

OBJECTS OF THE INVENTION

The present invention aims at finding a remedy to these significant drawbacks.

The patent application publications' numbers US 2014/217685 A1, CN 202754075 U and DE 20 2011 001596 U1 describe sets of elements with which it is possible to form diverse kinds of wheeled devices for children, which however do not give the possibility of perfectly finding a remedy to the aforementioned drawbacks.

SUMMARY OF THE INVENTION

The set of elements comprises:
a platform,
at least one front wheel,
at least one rear wheel,
a handle comprising an upright intended to be connected to the front of the platform, and a removable seat;
said handle is removable with respect to the platform, and the platform comprises, on the side of the front wheel (s), a well for receiving the lower portion of the upright which this handle comprises, for mounting the handle on the platform;
the platform comprises a front boss and said well opens at the upper portion of this boss;
the set of elements comprises a body for supporting the seat, the front portion of which has a front extension and a rear extension defining together a housing having a recessed shape corresponding to the shape of the boss, so that the supporting body is capable to be set into place on the boss in an adjusted way, with application of said front extension against the front portion of the boss and application of said rear extension against the rear portion of this boss;
the set of elements comprises means for mounting the seat on said supporting body, and
the set of elements comprises means for attaching at least one of said extensions to the platform.

The set of elements according to the invention thus gives the possibility of forming either a conventional scooter when said handle is mounted on the front of the platform, or a device capable to be straddled when the supporting body and the seat are mounted on the platform. The adjusted application of this supporting body on said boss allows a stable mounting of this body on the platform.

It will be understood that the terms of "front" and "rear" are to be considered with reference to the normal displacement direction of the device when it is used; "front" therefore means the portion of the device located on the front during this displacement and "rear" means the portion of the device located on the rear during this same displacement.

Preferably, the supporting body comprises, at a rear end, a well with shape identical with the one of the well which the platform comprises, capable to receive the lower portion of the upright which the handle comprises.

The set of elements thus gives the possibility of further forming a learning device, including the platform, the supporting body, the seat mounted on this body and the handle connected to the rear of this body. This handle thus allows an adult to control the use of the device by a child.

Preferably,
the supporting body has a portion for mounting the seat which extends from said front portion of this supporting body which is tilted relatively to this front portion, this tilt being such that when the supporting body is mounted on the platform, the portion for mounting the seat has a height increasing in the direction of the rear of the device, and
said means for mounting the seat on the supporting portion allow mounting of the seat according to at least two positions on this supporting portion, i.e. a front position, with a lower height, and at least one rear position, with a higher height.

The device may thus, according to the position given to the seat, be adapted to the size of the child, this seat being lower when it is in the front position and higher when it is in the rear position.

The tilt of said portion for mounting the seat may notably be such that a longitudinal axis of this supporting portion forms, when the supporting body is mounted on the platform, an angle of the order of 20 to 30° with the plane in which generally extends the platform, i.e. a plane parallel to the one containing the axles of the wheels.

According to another possibility, the means for attaching at least one of said extensions on the platform comprise:
a locking cavity formed in the front portion of the boss;
a locking cavity formed in said front extension of the supporting body, intended to coincide with the locking cavity which the boss comprises, when the supporting body is engaged on the boss; and
a locking member intended to be engaged into both locking cavities and dimensioned so as to extend in both of these cavities, so as to allow locking of the supporting body engaged on the boss.

According to another possibility, these same attachment means comprise:
a tapped hole and a holding cavity, one of which is formed on the front side of the boss and the other one on the rear side of this boss;
a hole formed on one of the extensions and a holding stud formed on the other extension, intended to respectively coincide with said tapped hole and engaged into said holding cavity during the mounting of the supporting body on the platform;
a screw intended to be screwed into said tapped hole.

The well may have an axis perpendicular to the plane in which generally extends the platform, in which case the handle has a rectilinear upright.

Alternatively, the well is of a general cylindrical shape and has an axis tilted in a front-rear vertical plane of the platform, towards the rear of this platform; the handle comprises an upright bent at its lower portion; this bend defines a lower portion of the upright, of a general cylindrical shape, which is intended to be engaged into the well with capability of pivoting in this well.

It will be understood that by the expression "front-rear vertical plane", is meant the longitudinal plane of the platform which is substantially perpendicular to the plane in which generally extends the platform, i.e. a plane parallel to one containing the axles of the wheels.

Thus, on the device according to this alternative, the handle is capable, by pivoting in the well, of passing from an unfolded position, in which it is substantially perpendicular to the platform, to a folded back position, in which it extends along the platform.

Preferably, the set of elements further comprises an elongated element capable to be mounted on the platform, transversely to this platform, and having a length such that it juts out on either side of this platform in this mounting position.

Both portions of this element which jut out on either side of the platform are capable to form foot-rests for the child straddling the seat.

According to a possible embodiment of the invention in this, case, said rear extension has a flattened free end portion capable to bear against the platform, said elongated element being intended to be mounted on the platform between this flattened free end portion and the platform.

In this case, the platform may comprise a tapped hole for mounting said elongated element, this elongated element may comprise a central mounting hole, and said flattened free end portion may also comprise a hole, these various holes coinciding with each other in said mounting position and being capable to receive a screw for mounting the extension and the elongated element on the platform.

The invention will be well understood, and other features and advantages thereof will become apparent, with reference to the appended schematic drawing, described hereafter; this drawing illustrates as a non-limiting example, a preferred embodiment of elements which the relevant set of elements comprises. In this drawing:

BRIEF DESCRIPTION OF THE DRAWINGS

FIG. 11 is a perspective view of elements making up said set of elements, according to a third embodiment, these elements not being assembled;

FIG. 12 is a partial view of these elements, in a perspective view according to another angle and at an enlarged scale;

FIG. 13 is a view of the front portion of a platform and of a supporting body which the set of elements comprises, in a longitudinal sectional view and at an enlarged scale;

FIG. 14 is a view of the front portion of the platform similar to FIG. 13, as well, also in a longitudinal sectional view, the lower portion of said handle;

FIG. 15 is a partial perspective view of elements belonging to this set of elements, in a position of the handle with respect to the platform;

FIG. 16 is a partial perspective view of these elements in another position; and FIG. 17 is a perspective view of these elements in an assembling condition, with mounting of the handle on the supporting body.

DESCRIPTION OF THE PREFERRED EMBODIMENTS

Figure 3:
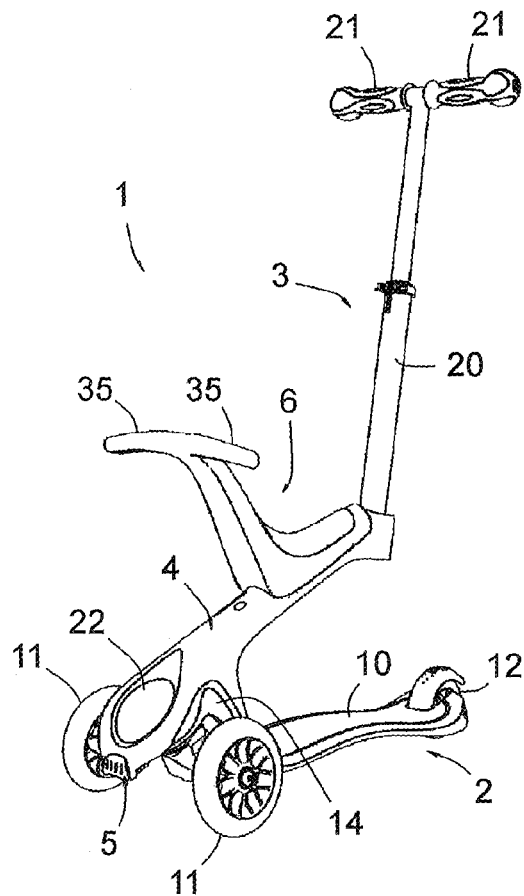
FIG. 3 is a perspective view of the elements shown in FIG. 1, in a assembling condition, with mounting of a handle which the set of elements comprises on the rear of a supporting body which this set of elements also comprises.
Figure 4:
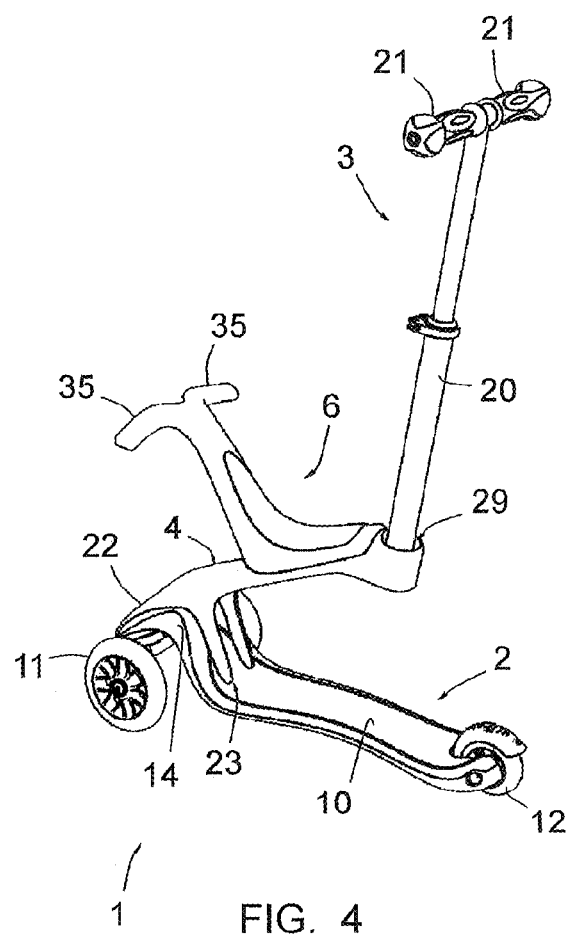
FIG. 4 is a perspective view of said elements, similar to FIG. 3, according to another angle.

FIGS. 3 and 4 illustrate a wheeled device 1 intended to be straddled by a child, formed from a set of elements which may be assembled. This set of elements comprises:

a sub-assembly 2 forming the base of a scooter;
a sub-assembly 3 forming a handle, hereafter said to be a "handle";
a supporting body 4;
a locking member 5, and
a removable seat 6.

Said set also gives the possibility of forming a device of the scooter type, by mounting the handle 3 directly on the sub-assembly 2.

This sub-assembly 2 comprises a platform 10 onto which a child may get on in the scooter version of the device, including, in the illustrated example, two front wheels 11 and a rear wheel 12.

Figure 1:
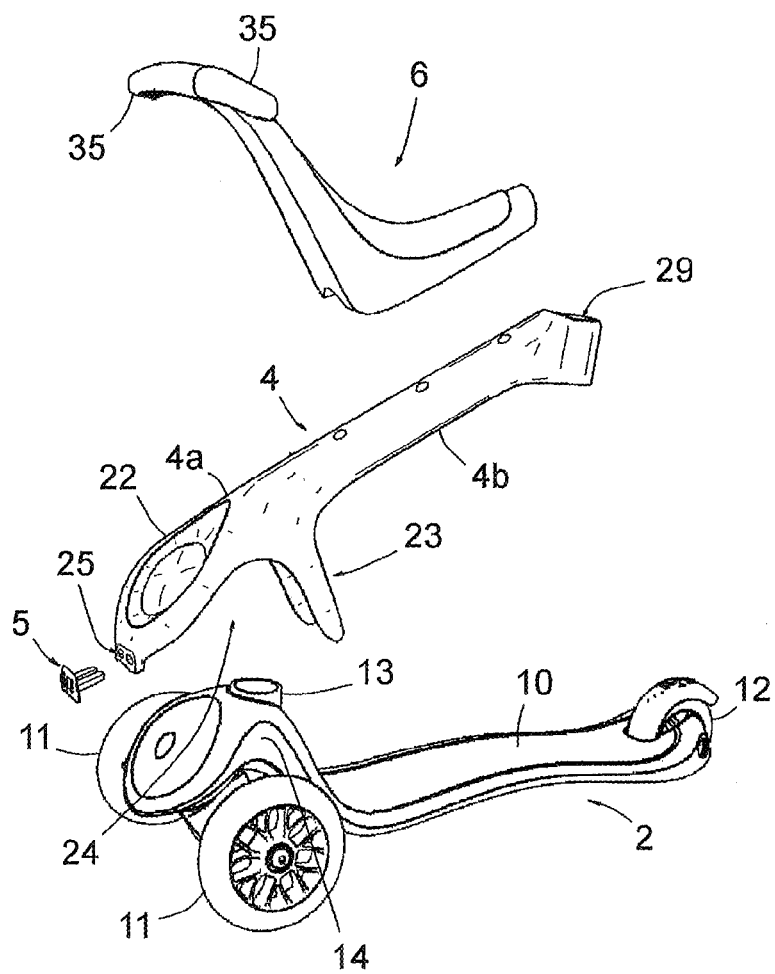
FIG. 1 is a perspective view of elements making up this set of elements, according to a first embodiment, these elements not being assembled.

As visible in FIG. 1, the platform 10 comprises, at its front portion, a mounting well 13 and a boss 14.

The well 13 is capable to receive a lower end portion of an upright 20 which said handle 3 comprises. In the first embodiment, this well 13 has an axis substantially perpendicular to the plane in which generally extends the platform 10, and the upright 20 of the handle 3 is rectilinear.

The well 13 opens at the upper portion of the boss 14, slightly on the rear of this boss.

The boss 14 surrounds the well 13 and comprises on its side located towards the front of the device 1, a locking cavity with two conduits, capable to receive with friction two rods forming the body of the locking member 5 (see FIG. 1). This friction gives the possibility of retaining the member 5 in this cavity but does not form an obstacle to a withdrawal of this member out of this cavity, by a manual withdrawal action of this member.

The other elements of the sub-assembly 2 visible in the figures (front axle; rear brake) are well known per se and are therefore not particularly described.

The handle 3 in addition to the aforementioned upright 20 comprises a pair of upper handles 21 strictly speaking, equipped with foam linings, which together form a handle bar.

The supporting body 4 has a front portion 4a and a rear portion 4b for mounting the seat 6.

The front portion 4a has a front extension 22 and a rear extension 23 defining between them a housing 24 having a recessed shape corresponding to the shape of the boss 14. This housing thus has a shape adjusted to that of the boss 14 so that the supporting body 4 is capable to be engaged on the boss 14 in an adjusted way, with application of said front extension 22 against the front portion of the boss 14 and application of said rear extension 23 against the rear portion of this boss 14.

The front extension 22 has an enlarged shape which will entirely cover the front face of the boss 14. At its front end, it comprises a locking cavity 25 with two conduits, coinciding with the homologous cavity formed by the boss 14 during the mounting of the body 4 on the sub-assembly 2. This cavity 25 is capable to receive with friction, just like the other cavity, both rods forming the body of the locking member 5.

The rear extension 23 is formed with two parallel branches together forming a stand which will bear against the rear face of the boss 14 and will rest against the platform 10.

Figure 2:
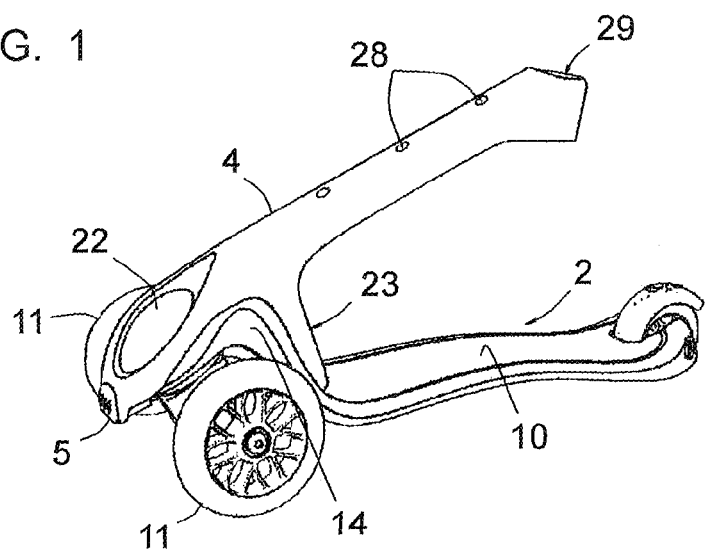
FIG. 2 is a perspective view similar to FIG. 1, of certain of these elements, in an assembling condition.

The rear portion 4b has a substantially rectilinear shape and extends from the front portion 4a while being tilted with respect to this front portion. As shown in FIG. 2, this tilt is such that, when the supporting body 4 is mounted on the platform 10, the portion 4b has a height running and increasing in the direction of the rear of the device 1. The angle formed in this mounting position by the longitudinal axis of this portion 4b with the plane in which extends longitudinally the platform 10 is of the order of 20 to 30 degrees. In other words, this longitudinal axis forms an angle of the order of 110 to 120 degrees with a straight line which extends at half a distance between the front extension 22 and the rear extension 23.

The rear portion 4b comprises three holes 28 for mounting the seat 6, and a rear well 29 for mounting the handle 3.

Figure 5:
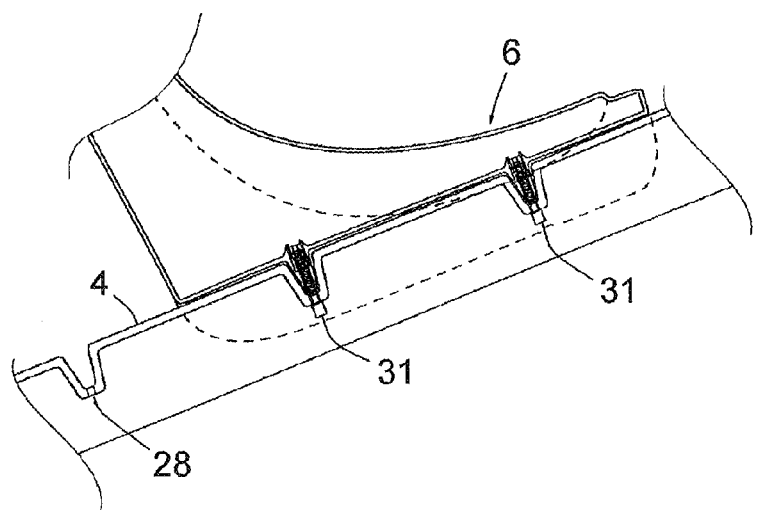
FIG. 5 is a partial, side and longitudinal sectional view, of said supporting body and of a seat which the set of elements comprises, in a sectional view, the seat being in one possible position of mounting relatively to the body.
Figure 6:
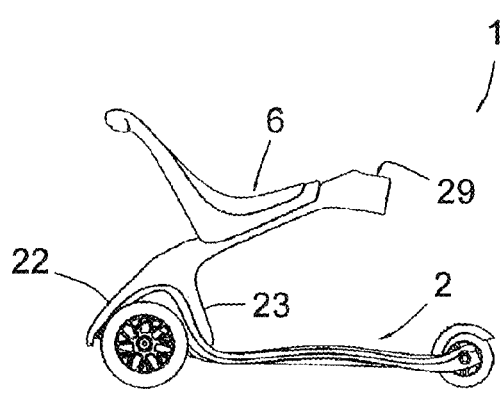
FIGS. 6 and 7 are views of the device from the side, in two possible mounting positions of the seat with respect to said body.
Figure 7:
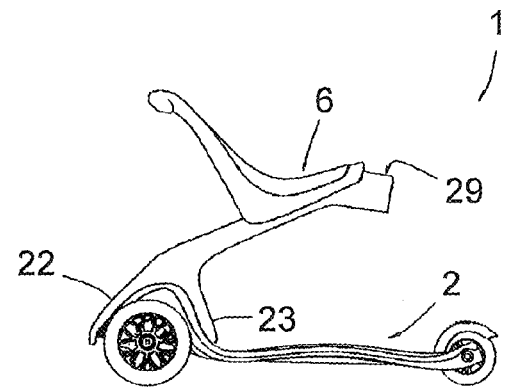

The holes 28 are regularly spaced apart. As this is visible in FIG. 5, they are formed at the bottom of cavities which the supporting body 4 forms and which are intended to receive screws 31 cooperating with tapped holes formed at the base of the seat 6. They thus allow mounting of this seat on the body 4 according to a front position of the seat 6, with a lower height, shown in FIG. 6, and a rear position, of greater height, shown in FIG. 7.

The well 29 has a shape identical with that of the well 13 and therefore allows the handle 3 to be mounted on the rear portion of the body 4, so that this handle protrudes from the device 1, towards the rear and upwards, as visible in FIGS. 3 and 4.

The locking member 5 has a gripping head and a body intended to be engaged with friction into both of the aforementioned locking cavities. The member 5 therefore allows locking of the body 4 in an engagement position on the boss 14.

The seat 6 as for it comprises a portion forming a seating surface for a child and a pair of side handles 35 forming fixed mini-handle bars, by means of which the child may be maintained on this seat.

The set of elements according to the invention thus gives the possibility of forming either a standard scooter when the handle 3 is mounted on the platform 10, or a device of the "mini-motorcycle" type when the body 4 and the seat 6 are mounted on this platform 10, or a learning device when the handle 3 is mounted on the body 4, this handle 3 then allowing an adult, having grasped this handle, to keep control of the thereby formed device 1.

Figure 8:
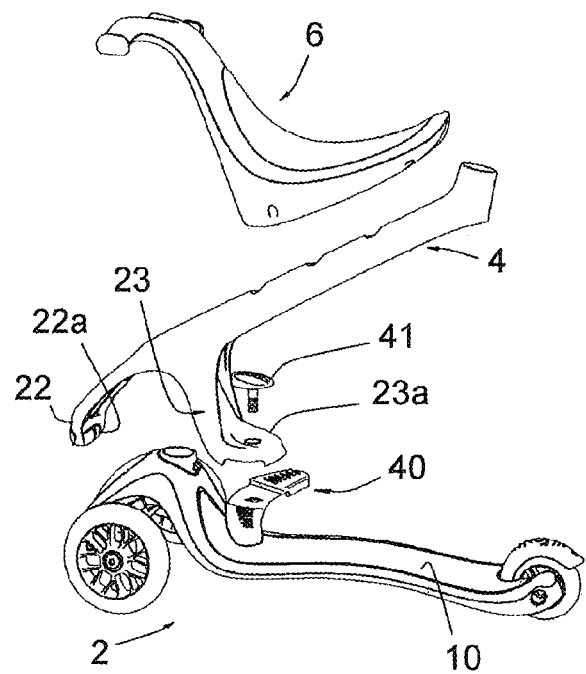
FIG. 8 is a perspective view of elements making up said set of elements, according to a second embodiment, these elements not being assembled.
Figure 9:
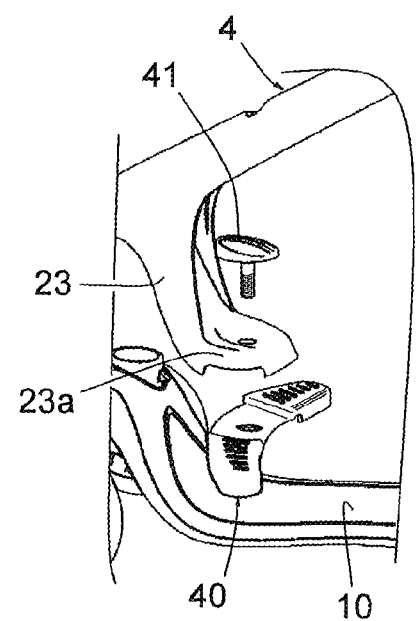
FIG. 9 is a partial view of these elements, in a perspective view and at an enlarged scale.
Figure 10:
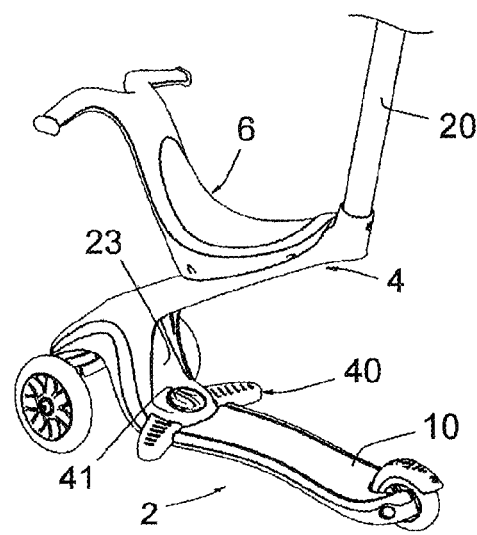
FIG. 10 is a perspective view of these elements, in an assembling condition, with mounting on them of a handle which the set of elements also comprises.

As visible in FIGS. 8 to 10, the set of elements according to the second embodiment comprises elements which are identical or very similar to those of the first embodiment; by simplification, the already described elements which are found in this second embodiment, will be designated with the same numerical references and will not be again described. The same applies for the third embodiment.

In this second embodiment, the set of elements further comprises an elongated element 40 capable of being mounted on the platform 10, transversely to this platform, and having a length such that it juts out on either side of this platform in this mounting position. Both portions of this element 40 which jut out on either side of the platform 10 are capable to form foot-rests for the child straddling the seat.

The rear extension 23 in this case is formed by a single branch ending with a flattened free end portion 23a capable to bear against the platform. The elongated element 40 is intended to be mounted on the platform 10 between this portion 23a and the platform 10.

For this assembly, the platform 10 comprises a tapped hole; the elongated element 40 comprises a central mounting hole, and said portion 23a also comprises a central mounting hole. These different holes will coincide with each other in said mounting position and are capable to receive a screw 41 for mounting the extension 23 and the element 40 on the platform 10.

The front extension 22, as for it, comprises a blocking stud 22a capable to come into adjusted engagement into a corresponding cavity formed by the boss 14.

According to the third embodiment shown in FIGS. 11 to 17, the well 13 has a general cylindrical shape and a tilted axis in a front-rear vertical plane of the platform 10, this tilt being in direction of the rear of this platform; the handle 3 then comprises, as visible in FIGS. 14 to 17, an upright 20 which is bent at its lower portion. This bend defines a lower portion 20a of the upright 20, with a general cylindrical shape, and which is intended to be engaged into the well 13 with a capability of pivoting in this well.

Thus, on the device 1 according to this embodiment, the handle 3 is capable, by pivoting in the well 13, of passing from an unfolded position, in which it is substantially perpendicular to the platform 10, to a folded back position, visible in FIG. 16, in which it extends along the platform 10.

The tilt of the axis of the well 13 is of the order of 45°, and the bent portion of the upright 20 extends over an arc such that the axis of the lower portion 20a forms an angle of the order of 135° with the longitudinal axis of the remainder of the upright 20.

With reference to FIGS. 13 and 14, it appears that the platform 10 is formed by a structural body 50, the thickness of which allows formation of the boss 14, and with a shell 51, of reduced thickness, letting the body 50 to be covered.

The shell 51 forms an opening 54 facing the well 13.

A groove 55 is formed in the body 50 co-axially with the well 13, at the upper portion of the latter and just below the shell 51. This groove 55 has a greater diameter than that of the opening 54, so that it is delimited by the shell 51 in the upper portion.

The groove 55 communicates, at its lower portion, with two radial housings 56 diametrically opposite to each other. This groove 55 and these housings 56 are capable to receive two diametrically opposite protrusions 75 which the portion 20a comprises, as described later on.

At the lower portion of the well 13, are formed two radial housings 57, 58 diametrically opposite to each other, which open into the well 13.

Further, the shell 51 forms two radial notches 60 opening into the aperture 54 (only one of them is visible in FIGS. 11 and 15). These protrusions 75 are capable to be engaged into these notches 60 and then into the groove 55, and then into the housings 56.

With reference more particularly to FIG. 14, it appears that the lower portion 20a and the adjacent bent a portion house a locking member 70 giving the possibility of controlling the assembling/disassembling and the locking of the handle 3 on the platform 10. This member 70 comprises a lower locking finger 71, an intermediate branch and an actuation portion 72. The finger 71 forms a right angle with the intermediate branch and is intended to be engaged in either one of the housings 57, 58.

The intermediate branch is urged by a spring 73 extending between it and the lower portion 20a, which normally maintains the member 70 in the position shown in FIG. 14, wherein the finger 71 protrudes radially beyond the wall of the lower portion 20a and is capable to be engaged into either one of the housings 57 or 58. The spring 73 is however capable of being compressed so that the finger 71 may be brought into a retracted position in which it does not protrude beyond the wall of the lower portion 20a and is therefore disengaged from the housings 57 or 58.

The actuation portion 72 is bent relatively to the intermediate branch. In the position shown in FIG. 14, it protrudes through a lumen formed in the lower portion 20a and in said bent portion.

The locking member 70 is pivotally mounted with respect to this lower portion 20a by means of an axis substantially located between the intermediate branch and the actuation portion 72.

The lower portion 20a comprises both aforementioned protrusions 75 secured to it, which are diametrically opposite to each other and which are positioned on a diameter parallel to the axis according to which the finger 71 is movable relatively to the lower portion 20a.

As this is understood, the handle 3 is capable to be separated from the platform 10 and to be mounted on the latter by engagement of the lower portion 20a into the well 13. In order to achieve this assembling, the handle 3 is placed in an intermediate angular position between its unfolding and folding positions, and then manual action is exerted on the actuation portion 72 so as to bring the finger 71 into the aforementioned retracted position, and the lower portion 20a is engaged into the well 13. The protrusions 75 are, in this same intermediate angular position, placed facing the notches 60; they are engaged through the latter, and then through the groove 55. The action on the actuation portion 72 may be released as soon as the protrusions 75 have engaged into the notches 60, the finger 71 bearing against the body 50 and therefore maintained in the retracted position. The handle 3 is then pivoted either towards the unfolding position, or towards the folding position, and when either one of these positions is attained, the protrusions 75 fall into the housings 56 and the finger 71, under the action of the spring 73, penetrates into the housing 57 or the housing 58 depending on the case, thereby locking the handle 3 in either one of these positions.

In order to pass from the unfolding position to the folding position visible in FIG. 16, the user exerts pressure on the actuation portion 72 so as to bring the locking member 70 into the aforementioned retracted position. By maintaining this pressure, he/she exerts axial traction on the lower portion 20a so as to extract the protrusions 75 from the housings 56 and to bring these protrusions 75 into the groove 55. In this position, the finger 71 is brought above the housing 57, so that maintaining said pressure on the actuation portion 72 becomes useless, and the protrusions 75 will abut against the shell 51, ensuring that undesired extraction of the lower portion 20a out of the well 13 cannot occur. The handle 3 is then pivoted as far as the folding position shown in FIG. 16, in which the protrusions 75 fall into the respective housings 56; the lower portion 20a is thus brought into the position in which the finger 71 is placed facing the housing 58 and engages into this housing under the urging of the spring 73, which locks the handle 3 in this folding position.

Moreover, in the third embodiment, as visible in FIGS. 13 and 14, the body 50 forms a tapped hole 80 on the front side of the boss 14 and a cavity 81 on the rear side of this boss. A hole is formed on the front extension 22 and a maintaining stud 82 is formed on the rear extension 23; this hole is intended to coincide with the tapped hole 80 in the mounting position of the body 4 on the platform 10, and the stud 82 is intended to engage into said cavity 81 in this same mounting position. A screw 85 is intended to be screwed into the tapped hole 80, in order to ensure the mounting of the body 4 on the platform 10.

The invention thus provides a set of modular elements 1 having extended possibilities of use, and having determining advantages.

The invention was described above with reference to embodiments provided as examples. It is obvious that it is not limited to this embodiment and that it extends to all the other embodiments covered by the appended claims.

What is claimed is:

1. A system for converting a wheeled device for children, the system comprising:
    a) a first set of elements including:
        a platform, the platform has a front end and a rear end;
        at least one front wheel connected to the front end of the platform;
        at least one rear wheel connected to the rear end of the platform;
    b) a second set of elements including:
        a handle comprising an upright;
        a supporting body having a first end connected to a lower section of the upright, a seat mounting portion, and a second end connected to the front end of the platform; and
        a removable seat connected to the seat mounting portion of the supporting body;
    wherein the handle is removable with respect to the supporting body;
    wherein the platform includes a well located on the front end of the platform, the well receives the lower section of the upright;
    wherein the front end of the platform comprises a boss, the boss having a front section and a rear section, and said well opens at a the rear section of the boss;
    wherein the supporting body includes in the second end having a front extension and a rear extension defining together a housing having a recessed shape corresponding to the shape of the boss;

wherein the supporting body is set into place on the boss by connecting the front extension against the front section of the boss and the rear extension against the rear section of the boss;

c) a mounting device for mounting the removable seat on said seat mounting portion of the supporting body, and d) an attaching device for attaching at least one of said extensions to the platform.

2. The system according to claim 1, wherein the first end of the supporting body comprises a second well with a shape identical to a shape of the first well of the platform.

3. The system according to claim 1, wherein the seat mounting portion of the supporting body is tilted relative to the second end of the support body, wherein when the supporting body is mounted on the platform, the seat mounting portion has a height increasing in the direction of the rear end of the platform, and wherein the mounting device allows mounting the removable seat in at least two positions, a front position having a lower height and a second position having a higher height.

4. The system according to claim 3, wherein the tilt of said seat mounting portion is such that a longitudinal axis of the seat mounting portion forms, when the supporting body is mounted on the platform, an angle of the order of 20 to 30° with a plane in which the platform generally extends, that is parallel to a plane containing axles of the wheels.

5. The system according to claim 1, wherein the attaching device comprises:

a first locking cavity formed in the front section of the boss;

a second locking cavity formed in said front extension of the supporting body, the second locking cavity coincides with the first locking cavity of the front section of the boss when the supporting body is engaged on the boss; and a locking member engaged into the first locking cavity of the front section of the boss and the second locking cavity on the front extension of the supporting body, the locking member is dimensioned to allow locking of the supporting body engaged on the boss.

6. The system according to claim 1, wherein the attaching device comprises:

a tapped hole located on the front section of the boss and a holding cavity located on the rear section of the boss;

a hole formed on the front extensions of the supporting body and a holding stud formed on the rear extension of the supporting body, the hole coincides with said tapped hole and the holding stud is engaged into said holding cavity during the mounting of the supporting body on the platform;

a screw screwed into said tapped hole.

7. The system according to claim 1, wherein the first well has an axis perpendicular to a plane in which the platform generally extends and the upright is a rectilinear.

8. The system according to claim 1, wherein the first well has a cylindrical shape and is tilted towards the rear end of the platform; the lower section of the upright is bent; the upright pivotably engages into the first well.

9. The system according to claim 1, further comprising an elongated element transversely mounted on the platform, the elongated element having a length that protrudes out of the platform in a mounting position.

10. The system according to claim 9, wherein said rear extension has a flattened free end portion that bears against the platform, said elongated element is mounted on the platform between the flattened free end portion and the platform.

* * * * *